March 25, 1969  W. E. WALLES  3,435,296
INCREMENTAL MAGNET

Filed April 29, 1965  Sheet 1 of 2

INVENTOR.
Wilhelm E. Walles

BY Griswold & Burdick
ATTORNEYS

United States Patent Office 3,435,296
Patented Mar. 25, 1969

3,435,296
INCREMENTAL MAGNET
Wilhelm E. Walles, Midland, Mich., assignor to The Dow Chemical Company, Midland, Mich., a corporation of Delaware
Filed Apr. 29, 1965, Ser. No. 451,865
Int. Cl. H01h 47/00; H01f 7/22, 1/00
U.S. Cl. 317—123      3 Claims

ABSTRACT OF THE DISCLOSURE

A magnetic coil operated at a superconductive temperature, superconductively connected with an also superconductive secondary winding of a transformer, the primary of said transformer being, optionally, outside the superconductive temperature zone and energized in shaped pulses; said magnetic coil and said secondary being magnetically decoupled; energized in pulses which rise rapidly or instantaneously to a peak value and decline slowly; deenergized by pulses of reverse shape. The device permits operation of superconductive magnetic coils at any magnetic field value up to their critical value.

Description of the invention

Figure 1:
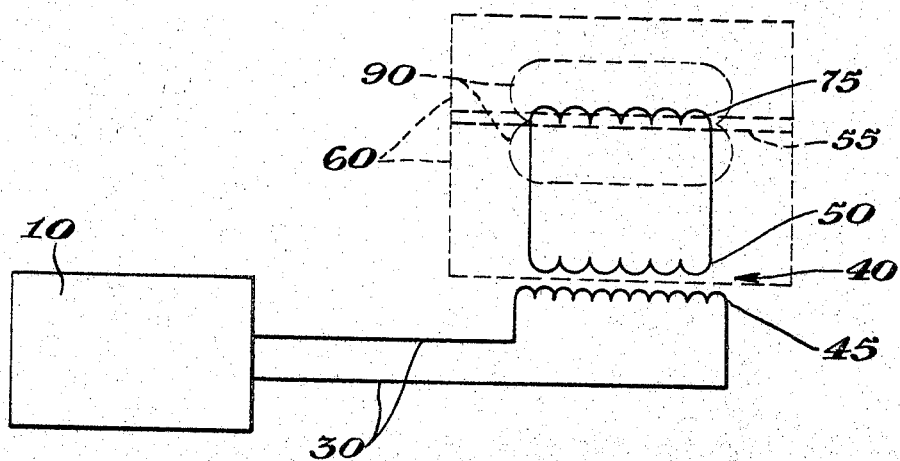

The present invention is concerned with magnetism and is particularly directed to a machine for the incremental energizing of a superconductive magnetic coil and to a method of energizing a high-energy magnetic coil to produce a high-energy magnetic field. The present invention also permits the efficient production of magnetic fields of which the strength is limited only by the critical field of a superconductor. The foregoing and other uses of the present invention will appear to those skilled in the art in view of the specification which follows.

It is known that the passing of an electric current through a conductor generates a magnetic field around the said conductor. It is further known that by shaping the said conductor in the general form of a coil which may be a helix, a torus, or any of various other shapes, it is possible for a magnetic field to be generated that has relatively high local intensity. The upper limit magnetic flux which can thus be generated is limited, if by no other factor, by the capability of the conductor to carry electricity without overheating. Such magnetic field as is thus generated can be shaped, to some extent concentrated and positioned, by the use of ferromagnetic core materials so shaped as to intersect and carry the magnetic flux to a chosen location, usually adjacent a gap between opposing poles. Such means are limited, however, as to the upper limit magnetic flux density which can be achieved, by the upper limit of current-carrying capacity of such conductor, and by the upper limit flux density at which the ferromagnetic core material becomes saturated.

It is known that many conducting substances, conveniently wires of common conducting metals, assume superconductive properties under which ohmic resistance virtually disappears when such conducting substances are cooled to temperatures near absolute zero. The transition temperatures lower than which many substances assume superconductive properties have been carefully studied and, for many conductive materials, are well-defined and accurately known. It is further a known practice to induce currents of electricity in closed, continuous coils of such substances while they are superconductive at low temperatures, giving rise to strong magnetic fields.

However, such efforts have always hitherto been handicapped by the necessity for causing relatively heavy conducting members such as wires or bus bars to extend from approximately room temperature zones into supercooled zones, thereby acting as means for the conduction of not only energizing current, but also relatively large amounts of heat into the supercooled zones with resulting serious inefficiency in the supercooling means.

Also, in energizing superconducting coils hitherto, it has been necessary to operate some kind of current control device, such as a thermal interruption of superconductivity, under liquid helium, with excessive loss of helium from its operation.

According to the present invention, I have discovered that a magnetic field of any value less than, or up to as great as, the upper limit magnetic field of which a conductor is capable under supercooled conditions, that is, the so-called "critical field," can be produced by a machine comprising essentially a magnetic coil which gives rise to magnetic field when electrically energized, and as a unitary structure therewith, a secondary winding of a transformer, said magnetic coil and said secondary winding being magnetically decoupled and both said magnetic coil and said secondary winding together with members by which they are connected as unitary structure being of material that becomes superconductive at temperature above 4.2° K., together with means for cooling said material to a temperature at which it is superconductive; there being, inductively coupled with said secondary winding, primary winding of said transformer, and electrically conductively coupled with said primary a source of asymmetric pulses of electrical energy of which the value varies between zero and one of the initiatory and terminal maximum values at a rate much greater than that at which it varies between zero and the other of said values. The said magnetic coil is thus energized by electric current which is conductively supplied to the primary of the said transformer as recurring pulses, each having a rate of increment much greater than its rate of decrement and of such magnitude that the conductivity heating of any non-supercooled wire through which said pulse passes is negligible. Although it is not essential and critical to the present generation of a magnetic field, it is convenient and preferred that the electrical supply to the said transformer primary be capable also of supplying electric current in regularly recurring pulses of which the rate of increment is much slower than the rate of decrement, thus providing means for the orderly reduction of the flux density of the magnetic field adjacent said magnetic coil, when desired. Thus, the critical wave shape, whether to energize or de-energize a magnetic coil of the present invention, is a pulse of asymmetric shape, as graphed for amplitude versus time, of which the value varies between zero and one of the initiatory and terminal maximum values at a rate much greater than that at which it varies between zero and the other of said values.

The general concept and the structural details of the present invention, together with the manner of its operation, will be easily understood by reference to the annexed drawings in conjunction with the following descriptions.

FIGURE 1 shows the invention schematically.

In FIGURE 1, source 10 is any convenient source of electrical energy of a desired magnitude supplied in pulses which, when it is desired to increase or maintain a magnetic field are pulses having a very high rate of increment up to a maximum pulse value, and a relatively slow rate of decrement. The most convenient way of reducing the intensity of a thus-produced magnetic field is to de-energize it with corresponding pulses of reversed shape, that is to say, pulses having a relatively slow rate of increment and a very high rate of decrement. Desirably then, source 10 should be able to supply electrical energy in pulses of either shape.

Figure 2:
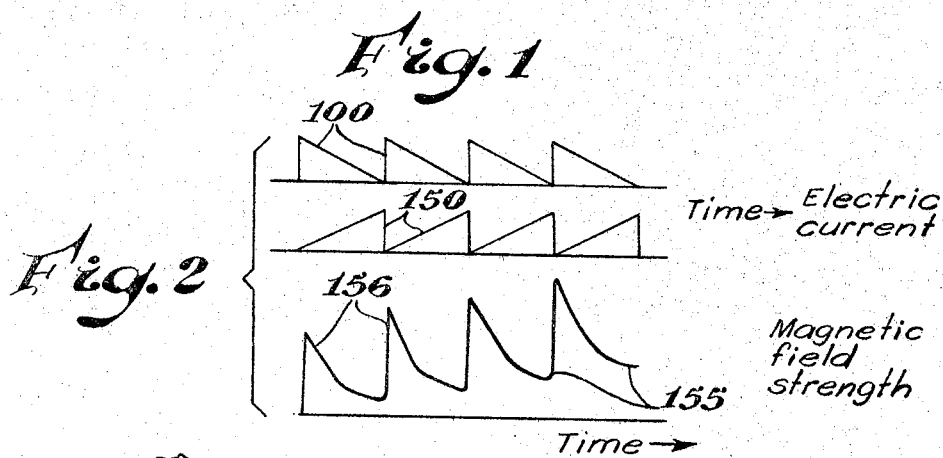

In FIGURE 2, pulses of shape 100 represent a shape of a pulse of electric current graphed as energy versus time, and useful for increasing or maintaining magnetic flux in the present invention whereas pulses of shape 150 are useful for decreasing flux density. The polarity of the pulses may be chosen with respect to the polarity of the magnetic field that it is desired to produce. For efficiency, individual pulses should achieve minimum value of about zero although a minimum value relatively moderately above or below zero has no harmful effect. Good results are obtained when employing wave shapes that manifest the essential asymmetry here described but with substantial deviations from these preferred wave shapes. However, such deviation is accompanied by loss of efficiency which may be most seriously felt as an increased burden upon the cooling system by which the the superconductive state is maintained.

Exact preferred wave shapes and proportions will depend in part upon the exact structure and geometry of transformer 40.

The absolute values, both momentary and limiting, of the electrical energy in the pulses by which the magnetic coil member of the present invention is energized will depend upon various factors: notably the physical dimensions and magnetic density of the magnetic field that it is desired to produce. In general, such absolute values will seldom be as great as one percent of the values that would be employed if conventional means were being employed in the production of a magnetic field of comparable upper limit density. Consequently, electric supply wires 30 in FIGURE 1 can and will usually be relatively small in size. This is desirable because larger wires would be able to introduce relatively greater heat loss by conduction from room temperature to the supercooled zone. Conductor size of supply wires 30 may be chosen with respect also to the fractional cycle of duty represented in the indicated wave shape.

In FIGURE 1, the single primary winding 45 and paired electric supply wires 30 for transformer 40 imply the employment of a single-phase system. However, this is purely a matter of convenience, and, although the present transformer is used to carry pulses of direct current, transformers of known design employing polyphase windings and currents in primary or secondary or both are comprehended within the present invention and may, in some situations, be preferred. The turns ratio between primary winding 45 and secondary winding 50 will be selected upon known bases, including the frequency, amplitude, exact wave shape and other characteristics of shaped pulse electrical energy from source 10 and the properties of windings and the like of transformer 40. In general, known transformer design considerations may be employed with regard for the fact that secondary 50 as well as perhaps primary 45 and adjacent portions of electric supply wires 30 will be operated at relatively low temperatures and heating should be avoided. Whether the primary winding 45 is operated at a superconductive temperature will depend not only upon the operating temperature but also upon the identity of the chosen conductive material of which the winding is made and whether room temperature access is provided. Such operation is not necessary so long as secondary winding 50 and magnetic coil 75 which can be selected as having a high critical temperature, are superconductive at operating temperatures.

It is essential and critical in the present invention that both magnetic coil 75 and transformer secondary winding 50 be continuously operated in a superconductive state; desirably, the said windings should be made of a continuous length of homogeneous material cast free from such discontinuous or heterogeneous regions as would be introduced by soldering, brazing, mechanical linkage, or the like. In one method, there is cast a single, continuous ingot of superconductive material, from which, thereafter, the coil is machined.

The magnetic field 90 to the production of which the present invention is directed, arises in known manner adjacent magnetic coil 75, when the coil is energized.

Those skilled in the art of inductive coupling will recognize that magnetic field 90 is of a sign opposite the sign of the necessary magnetic field which is intermittently induced around the transformer windings as transformer 40 is energized. Therefore, magnetic coil 75 must not be inductively closely coupled with transformer 40. The degree of decoupling will depend upon the desired upper limit magnetic flux density desired to be achieved. Decoupling is readily achieved by mechanical spacing, magnetic shielding, and the like.

In view of the foregoing description of the general structure of the present machine, the general manner of of it operation may be described as follows.

With reference to the embodiment in FIGURE 1, all the parts comprised within supercooled zone 60 are cooled to a temperature such that secondary winding 50 and magnetic coil 75 become superconductive. Supercooled zone 60 can extend to include primary winding 45 and portions of electrical supply wires 30 and this will sometimes be preferred. However, it is critical only that there be adequate inductive coupling in transformer 40 to energize secondary 50 and coil 75 from primary 45, whether or not primary 45 is supercooled. If desired, means for the measurement of intensity of magnetic field 90 are positioned in proper orientation adjacent thereto. FIGURE 1 illustrates one embodiment of room temperature access 55 to the magnetic field adjacent coil 75.

The components of the machine being otherwise at rest, a shaped pulse of electrical energy of which the shape represents a rapid rise and slow decay of supplied energy, that is, a pulse that corresponds generally to shape 100 in FIGURE 2 is caused to pass through primary winding 45 of transformer 40. The initial rapid increment of this shaped pulse induces an electric current of opposite sign but essentially the same shape, into secondary winding 50, the said current flowing through all parts of both secondary winding 50 and magnetic coil 75 together with portions thereof by which they are connected together. This current flow results in the development around each of secondary winding 50 and magnetic coil 75 of a magnetic field. The collapse through space around primary winding 45 of its magnetic field intersects primary winding 45 and tends therein to generate electrical energy as a counter-electromotive force opposed to that whereby the said magnetic fields were generated. This counter-electromotive force is met by the electrical energy represented in the slow decrement of the pulse of shape 100. Ideally, the shape of the said decrement should exactly oppose the shape of such induced counter-electromotive force. It will thus be apparent to those skilled in the art that the indicated wave shape or a wave shape not differing greatly therefrom is essential and critical to the efficient operation of the instant machine. In contrast, when primary winding 45 is experimentally energized by spaced successive pulses of approximately square or sine shape or simple pulses having amplitude but very brief duration, the counter-electromotive force almost completely balances the supply, and magnetic field 90 is at best only temporarily energized.

When magnetic coil 75 is energized in the indicated manner by shaped electrical pulses, an electric current is caused to flow in the indicated manner through the continuous member comprising magnetic coil 75 and secondary winding 50 together with members whereby they are conductively connected together. Because this entire conductive unit is a closed circuit and is superconductive, electrical energy in the amplitude induced by inductive coupling with primary winding 45 as energized will continue to flow almost free of ohmic loss. Magnetic field 90, once established, stands in the vicinity of magnetic coil 75 and transformer secondary 50 in a relatively steady condition, unless energy be in some way withdrawn from it.

At this juncture, a succeeding energizing pulse essentially the same as the one previously described, is supplied from source 10 to primary winding 45 and functions in essentially the manner previously described except that electromotive force induced into the superconductive member comprising secondary winding 50 and magnetic coil 75 is added to the electromotive force previously described with the result that the more or less loss-free continuously flowing current in the said superconductive member has value representing essentially the increment from both first and second pulses as described.

Succeeding pulses operate in the same manner with the result that the flowing current in the said superconductive member increases by pulse increments in value to any desired level, provided only that the said member remain superconductive.

The strength of magnetic field 90 is graphically represented in FIGURE 2 as field strength graphed against time by pulse shape 156 and accumulating field strength as represented at 155.

When a substance, typically a metallic substance, is superconductive, its electrical properties in the ordinary sense cease to exist. In the superconductive state all substances are essentially alike as to conductivity, differing in various parameters such as temperature at which superconductivity arises, critical magnetic field at which superconductivity is destroyed, and the like. Therefore, at least at low levels of magnetic field, superconductive substances are fully interchangeable in the present invention. Among substances available are the following:

TABLE I

| Element | Approximate transition temperature in ° K. | Critical field at 4.2° K. in oersted ($\approx$ gauss) |
|---|---|---|
| Technetium | 11.2 | Unknown |
| Niobium | 8.7-8.9 | 1,560 |
| Lead | 7.22 | 530 |
| Lanthanum | 4.8-5.8 | Unknown |
| Tantalum | 4.38 | 0.35 |
| Vanadium | 4.89 | 351 |

*Superconductivity of best elements*

In addition to these elements, certain metallic alloys and alloy-like or metal-like compounds, some of which are intended especially for superconductivity uses, can be employed, such as niobium nitride, niobium carbide, tantalum carbide, gallium arsenide, niobium-tin and niobium-zirconium alloys, a lead-arsenic-bismuth alloy, a lead-bismuth-antimony alloy, lead-tin-bismuth alloy, lead-arsenic alloy, molybdenum carbide, pentalead dinitride, bismuth-thallium compounds, antimony thallium compounds, and tantalum silicide. Among these a choice will involve appraisal of the critical magnetic field.

Various related matters will at once be evident to those skilled in the art. Firstly, the instantaneous magnetic flux initially imposed upon secondary winding 50 by its inductive coupling with primary winding 45 as primary winding 45 is energized must not, as a pulse, exceed the value of the critical magnetic field above which secondary winding 50 would lose its superconductivity.

Secondly, because there is very little ohmic loss in the superconductive member comprising magnetic coil 75 and secondary winding 50, the situation develops that despite the flow of relatively heavy current, almost no voltage can be measured within the said member. To the extent it is desired to measure the electrical energy within the said superconductive member, the most practicable method of such measurement will usually be measurement of magnetic field 90 from which hypothetical or actual values of the current flow in the said supercooled member can be calculated. This is the method preferred for monitoring the approach to current and field density conditions that would destroy the necessary superconductivity.

Thirdly, because conductive materials in a superconductive state by reason of extremely low temperature have virtually no ohmic resistance and may therefore carry extremely heavy flow of current, it should be noted that the supercooled superconductive portions of the present machine, when carrying such heavy current, if permitted again to become ohmically conductive, will have the effect of abruptly interposing a relatively high ohmic resistance path in the way of a relatively heavy current. The values of current and ohmic resistance if the superconductive portions of the present machine suddenly become conductive are commonly of such relative values that, upon transition from the superconductive to the conductive state, such conductive portions of the present machine might, depending upon the energy present, be melted or vaporized at least locally, with release of large amounts of heat. Such release of heat, immediately adjacent the liquefied gases commonly used to maintain a supercooled condition, would be expected to give rise to rapid vaporization of the gases so that the resulting changes in physical state could be of explosive proportions. Therefore, it is desired for safety—although it is not critical to achieve the benefits of this invention in a single expendable instance—that the superconductive portions of the present machine be de-energized or nearly so before the superconductive condition be terminated.

Fourthly, it should be noted that, although the conditions necessary for the establishment of a high-level magnetic field according to the present invention require that certain conductive portions of the apparatus be supercooled, the magnetic field itself readily proceeds outside such supercooled zone, and once established, may be employed with room temperature access 55, provided that the mechanically near portions of the machine which must be supercooled in order to operate be, indeed, maintained at a supercooled condition. Thus, for example, a shell or housing within which the supercooled parts of the equipment may be maintained may be in a generally toroidal shape such that the supercooled zone, conductors and the like, are positioned within the toroidal shape; but the magnetic field to which the device gives rise may move freely in the unoccupied space surrounded by and outside the toroidal shape, to give room temperature access.

Thus, when it is desired to employ the present machine as a means of energizing or fixing the magnetic field of a fixed magnet which is of a magnetic alloy material maintained under a magnetic field as it cools from the liquid to a solid condition, the said alloy material may be at its melting temperature or above, or at any temperature from such higher temperature down to room temperature or below; when employing the present machine in the attempt to modify biological or chemical activities, such biological or chemical activities may go on at such temperature as is desirable from the standpoint of the nature of the activity sought to be modified. In any event, the maintenance of magnetic coil 75 and secondary winding 50, the essential and critical parts of the present machine, in a supercooled and superconductive condition defines the criticality of such supercooling.

The present machine is not operative when the entire machine and all its parts—considering its parts to extend as far as connection to a main electrical supply line—are superconductive. It is essential and critical that certain resistance elements, for example, those employed in generation of a shaped wave—must manifest their typical and desired ohmic resistance. However, by the choice of suitable materials for the superconductive magnetic coil and adjacent transformer secondary, it is possible to design the present machine so that certain necessary parts retain their ohmic properties whereas others become superconductive at a temperature relatively near to 0° K. without rendering superconductive all the parts of the present machine.

Thus, by the judicious choice of parts, it is possible to operate the present machine in such temperatures as are encountered in the shadow of celestial bodies at distances relatively remote from the earth's atmosphere without resort to artificial cooling. Thus, when employing the present device in conjunction with space vehicles and the like, the operation of the device may be delayed by timing devices or by thermostatic control until the device is cooled to a temperature at which parts necessary to be superconductively cooled will have achieved superconductivity, whereas other parts not so readily rendered superconductive retain their ohmic properties; in this condition, the operation of the device may be initiated and successfully carried out.

In more conventional terrestrial locations such as routine fixed laboratory work, supercooling is most conveniently accomplished by the use of liquefied gases. The employment of a bath of liquid helium, preferably with an insulating vacuum, as a Dewar flask, permits the achievement of temperatures low enough that a substantial variety of metallic substances assume superconductivity thus rendering the present machine operative. However, other cooling means may be employed; the nature and identity of the cooling means is not essential or critical. For example, a Collins helium cryostat can be used, as can also magnetic cooling, with the employment of any desired liquid heat transfer substance.

When employing liquid helium as the ultimate coolant, it is to be noted that the liquid helium itself has sufficiently low electrical conductivity under the employed conditions that further electrical insulation of otherwise uninsulated metal conductors is not necessary provided only that they be spaced away from direct contact with one another. Electrical loss through the liquid helium may be essentially ignored.

It is also to be noted that liquid helium has extremely low heat of vaporization and, while useful for achieving very low temperatures, is not an efficient medium for cooling through uptake of heat of vaporization.

The following example illustrates the best method of practicing the present invention now known to the inventor.

Example

A mold is prepared of glass tubing of approximately 2 millimeters inside diameter by heating the tubing to a workable temperature and forming it around a mandrel of approximately 1.5 centimeters diameter, providing 17 turns each spaced apart from the adjacent turn by approximately ¾ inside diameter. From this shaped portion the tubing mold continues, a portion of the tubing of which it is made being produced straight in a direction initially tangential to a terminal turn of the indicated coiled portion. At a distance of approximately 10 mandrel diameters, the mold is again produced as a coil by winding the said tubing (at a workable temperature) around the same mandrel, the turn spacing as hereinbefore indicated, for 20 turns, the axis of the resulting coil presently, but not critically, parallel to the axis of the first said coil. From the 20th such turn, the tubing is shaped tangentially to meet the first turn of the coil first above described. The ends of the tubing are brought together uniformly and are fused together, thus providing a one-piece continuous mold. An opening ts cut in this mold with a small abrasive burr, the mold so positioned that the opening is at a highest point, the mold warmed to a temperature at which fracture from thermal shock is unlikely to occur, and thereafter is poured full of chemically pure lead at barely above its melting temperature. The lead is permitted to cool in the said mold until it is hardened and the mold is thereafter broken off gently with a minimum of deformation of the lead coil thus cast. The 17-turn portion of this coil constitutes magnetic coil 75 and the 20-turn portion constitutes secondary winding 50 as indicated in FIGURE 1. It is shown in generalized structure in FIGURE 3. A length of glass tubing slightly longer than the lengthwise extension of secondary winding 50 is introduced into the winding in the manner in which the mandrel occupied it as it was being wound. Within this tubing, primary winding 45 is positioned, and consists of a plurality of self-supporting, air-spaced turns of number 22 bare copper wire. The diameter of the turns is approximately as great as will be accommodated inside the indicated glass tubing.

A similar tubing is introduced into the interior of magnetic coil 75, and used to support the sensing probe of a gaussmeter.

Figure 3:
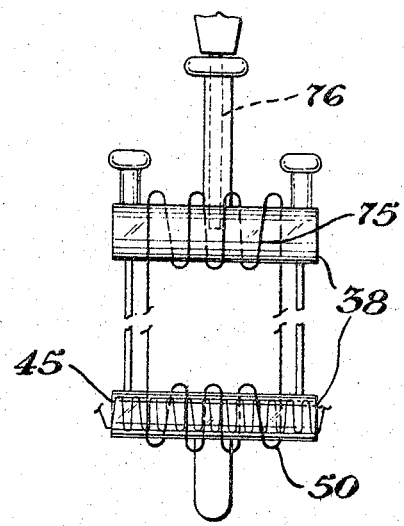

The two said pieces of tubing are joined at their ends and provided with external projections, as support means 38 in FIGURE 3, which illustrates also the present arrangement of coils.

Figure 4:
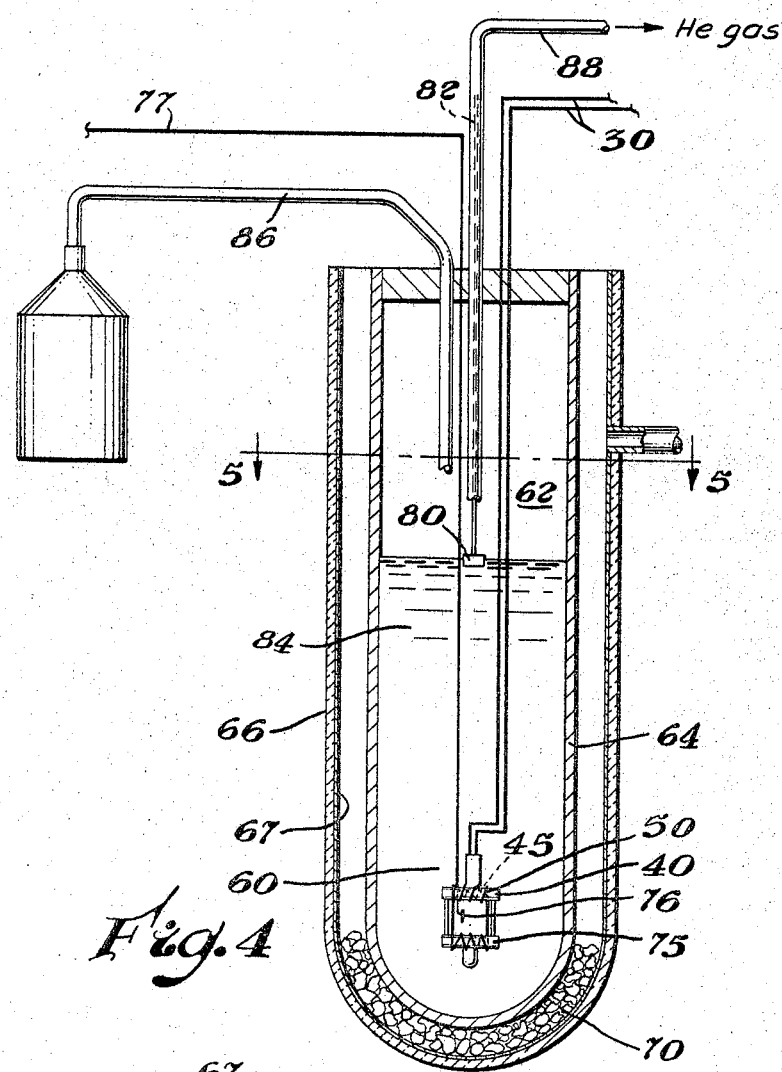
Figure 5:
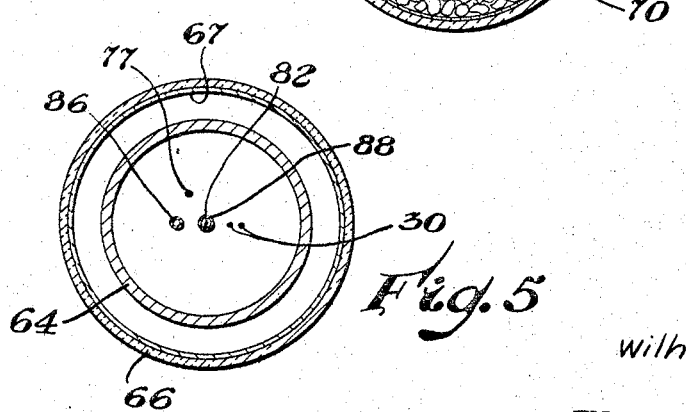

The entire coil and support assembly as shown in general view in FIGURE 4 and end view in FIGURE 5, together with glass tubing supports is positioned within a Dewar flask. This Dewar flask comprises a glass-walled interior insulated chamber 62, of approximately 10 centimeters diameter, defined and essentially enclosed by a double-walled, evacuated Dewar insulating chamber 66 with interior silver plating 67 on its outer wall. The inner and outer walls are about a centimeter apart and joined at their necks, the inner supported by (here glass wool) support means 70, and the space between evacuated through neck 63. In use, the interior chamber 62 is filled approximately half full with liquid helium. Inlet duct 86 is provided for supply of liquid helium 84. The electrical conductor formed as primary winding 45 is produced at each end of the said winding as a lead wire, the resulting pair of leads 30 being brought out of the top of the Dewar flask and thereafter conventionally connected to a source of shaped electrical energy pulses of the sort hereinbefore described. Helium exhaust 88 and loose asbestos gasket 68 complete the basic structure.

As instrumentation, gaussmeter probe 76 is mounted appropriately adjacent magnetic coil 75, and connected by leads 77, with the gaussmeter, not shown. As is evident in the drawings, magnetic coil 75 may be farther (as in FIGURE 4) from or preferably nearer (as in FIGURE 3) to the gasketed opening 69 of the Dewar flask assembly.

Also, expanded polystyrene float 80 affixed to cooperating float level indicator 82 (presently a broom straw of exact length) is provided to indicate simply the depth of liquefied coolant gas within the Dewar flask. Other depth-indicating means can be used.

In the instant machine, energizing pulses are provided by pulse generating means, not shown. This is presently effected by connecting the leads 30 with the rotary arm and one terminal of a potentiometer of which the resistance member has essentially linear characteristics, which is motor driven at a controlled speed, typically approximately 15 revolutions per minute, the said potentiometer being supplied, across its resistance member, with direct current from a regulated supply. The version of pulses, whether to energize as in shape 100 in FIGURE 2 or de-energize as in shape 150 in FIGURE 2 magnetic coil 75, is determined, other conditions remaining constant, by the direction of motor-driven rotation of the potentiometer rotor arm. In the present machine, energy is supplied to the leads connecting with primary winding 45 as a suddenly arising pulse instantly at maximum value, thereafter declining as the potentiometer arm rotates, to essentially zero at which point a further rise to maximum value instantly occurs. This is graphically shown in FIGURE 2, shape 100. By corollary, when the motor is run in the other, or de-energizing direction, the energy supplied to the leads to primary winding 45 rises gradually from zero to a maximum value and thereafter drops off to zero, thereafter again rising to maximum value. This is shown graphically in FIGURE 2, shape 150.

It is to be noted that the use of such rotary potentiometer, while convenient and while admitting, by characteristics of the potentiometer winding, of exact control of wave shapes over a range of frequencies convenient in the present invention, is by no means critical. An electronic oscillator of any of various known kinds, the output of which is, after rectification, of desired wave shape, can be employed. When desired, a high frequency oscillator is used, including frequencies in the audio- and radio-frequency range. Full- or half-wave rectification can be used, or a rectifying bias can be applied.

To bring the device into operation, magnetic coil 75 and unitary secondary winding 50, together with supports and primary winding 45 and a gaussmeter probe are lowered, by a glass support and fixed in position at the bottom of the Dewar flask 62 as before described. Thereafter, the flask 62 is filled approximately ½ full with liquid helium. Waste gas, lost as the liquefied helium is supplied to the Dewar flask chamber, is vented away, here through Bunsen valves, not shown, terminating exhaust 88 for helium.

In the instant example, no means are provided for measuring the temperature achieved in the Dewar flask, reliance being had, rather, upon the purity and known boiling characteristics of the chosen gas.

When the float indicator shows that a depth of liquefied gas believed to be sufficient has been achieved, a plywood safety partition is placed between the Dewar flask and the operator, the regulated direct current power supply is brought into operative condition, and energizing through the rotating potentiometer is begun.

The output of the indicated gaussmeter is connected with a scribing pen on a moving graph paper tape, in standard laboratory procedures.

As the energizing of the superconductive secondary winding 50 and unitary magnetic coil 75 continues in the indicated manner, the trace of the gaussmeter output proceeds stepwise upward, the steps corresponding in time but not in shape to the energizing current.

The upward process of the gaussmeter graph indicates a rising level of magnetic flux in magnetic coil 75; absolute values are not determined but it is estimated that an increment of from 0.1 to 0.5 gauss per rotation of the potentiometer is achieved. The incremental shape is essentially that shown in FIGURE 2, shape 155.

It will be noted that the flux represented by peaks 156, of increment shape 155 of magnetic field 90 must not exceed the critical flux for the chosen superconductive material.

Operation of the present machine with a lead coil is continued for approximately 500 charging cycles, that is, approximately 500 rotations of the potentiometer arm, by which time a residual magnetic field of approximately 50 gauss has been developed. Charging is discontinued and the gaussmeter observed for 2 hours. At the end of this time, a flux in excess of 45 gauss remains.

Potentiometer rotation is reversed and the flux of magnetic field 90 is reduced to essentially zero. Decline occurs in per-cycle decrements moderately greater than the per-cycle increments.

In a succeeding operation, essentially the same procedures are followed but charging continues to a level of approximately 75 gauss. After about 2 hours observation, during which very slight loss occurs, presumably mostly through the gaussmeter probe, the coil is again de-energized as described.

In another preferred method, the coil is energized by the rectified, half-wave output of an electronic oscillator, the reading of the gaussmeter being fed, through a direct-current amplifier, as a biassing potential to a control grid of the rectifier or equivalent circuit. By adjustment of circuit component valves, the device thus becomes self-limiting and does not exceed a predetermined strength of magnetic field 90.

I claim:
1. Machine for producing high level magnetic field comprising essentially:
   a magnetic coil which gives rise to a magnetic field when electrically energized, and as a unitary structure therewith,
   a secondary winding of a transformer,
      said magnetic coil and said secondary winding being essentially magnetically decoupled, and
      both said magnetic coil and said secondary winding together with members by which they are connected as unitary structure being of material that becomes superconductive at temperatures above 4.2° K.,
   together with means by which said material is cooled to a temperature at which it is superconductive,
   there being, inductively coupled with said secondary winding, a primary winding of said transformer, and
   electrical means for supplying to the said primary an energizing pulse of electrical energy that is characterized by very rapid increase to a predetermined maximum value, and thereafter decreases gradually with time or a deenergizing pulse that increases gradually with time to a minimum value and thereafter decreases in value very rapidly.

2. Machine of claim 1 wherein the member that becomes superconductive is of the metal lead.

3. Process for producing high-level magnetic field comprising essentially:
   energizing
      a magnetic coil which gives rise to a magnetic field when electrically energized, and having as a unitary structure therewith,
      secondary winding of transformer,
         said magnetic coil and said secondary winding being essentially magnetically decoupled, and
         both said magnetic coil and said secondary winding together with members by which they are connected as unitary structure being of material that becomes superconductive at temperature above 4.2° K.,
   together with means by which said material is cooled to a temperature at which it is superconductive,
   there being, inductively coupled with said secondary winding, primary winding of said transformer,
   by supplying to the said primary a pulse of electrical energy that is characterized by very rapid increase to a predetermined maximum value, and thereafter decreases with time.

References Cited

UNITED STATES PATENTS 3,150,291   9/1964   Laquer    317—123
3,271,628   9/1966   Prior    317—123

LEE T. HIX, *Primary Examiner.*

U.S. Cl. X.R.
335—216